United States Patent [19]

Tanaka et al.

[11] Patent Number: 4,846,496
[45] Date of Patent: Jul. 11, 1989

[54] VEHICLE SUSPENSION APPARATUS

[75] Inventors: Tadao Tanaka, Okazaki; Sunao Chikamori, Nagoya; Mitsuhiko Harara; Shinichi Takeuchi, both of Okazaki; Masanaga Suzumura, Nagoya; Minoru Tatemoto, Okazaki; Naotake Kumagai, Aichi; Hiroki Abe, Okazaki, all of Japan

[73] Assignee: Mitsubishi Jidosha Kogyo Kabushiki Kaisha, Tokyo, Japan

[21] Appl. No.: 141,425

[22] Filed: Jan. 7, 1988

Related U.S. Application Data

[62] Division of Ser. No. 694,666, Jan. 24, 1985, Pat. No. 4,730,843.

[30] Foreign Application Priority Data

| Jan. 24, 1984 | [JP] | Japan | 59-7194 |
| Jan. 24, 1984 | [JP] | Japan | 59-7195 |
| Jan. 24, 1984 | [JP] | Japan | 59-7196 |
| Jan. 24, 1984 | [JP] | Japan | 59-7200 |
| Jan. 24, 1984 | [JP] | Japan | 59-7203 |
| Jan. 24, 1984 | [JP] | Japan | 59-7206 |
| Jan. 24, 1984 | [JP] | Japan | 59-7209 |
| Jan. 24, 1984 | [JP] | Japan | 59-7218 |
| Jan. 24, 1984 | [JP] | Japan | 59-7220 |
| Jan. 24, 1984 | [JP] | Japan | 59-7222 |
| Jan. 24, 1984 | [JP] | Japan | 59-7224 |
| Mar. 22, 1984 | [JP] | Japan | 59-39916 |
| Mar. 22, 1984 | [JP] | Japan | 59-39919 |
| Mar. 22, 1984 | [JP] | Japan | 59-39920 |

[51] Int. Cl.[4] .................................... B60G 17/04
[52] U.S. Cl. .............................. 280/689; 280/707
[58] Field of Search ......... 280/689, 707, 772, DIG. 1, 280/6 H, 6 R; 364/424; 180/143, 282

[56] References Cited

U.S. PATENT DOCUMENTS

| 3,608,925 | 9/1971 | Murphy | 280/112 A |
| 4,065,154 | 12/1977 | Glaze | 280/707 |
| 4,669,749 | 6/1987 | Tanaka et al. | 280/707 |
| 4,730,843 | 3/1988 | Tanaka et al. | 280/689 |

FOREIGN PATENT DOCUMENTS

| 53-26061 | 3/1978 | Japan . | |
| 57-182505 | 11/1982 | Japan | 280/772 |
| 118513 | 7/1984 | Japan | 280/707 |
| 81810 | 4/1986 | Japan | 280/707 |
| 125913 | 6/1986 | Japan | 280/707 |
| 150809 | 7/1986 | Japan | 280/707 |
| 263815 | 11/1986 | Japan | 280/707 |
| 96112 | 5/1987 | Japan | 280/707 |
| 1335758 | 10/1973 | United Kingdom . | |

Primary Examiner—Charles A. Marmor
Assistant Examiner—Eric Culbreth
Attorney, Agent, or Firm—Birch, Stewart, Kolasch & Birch

[57] ABSTRACT

Wheel suspension units each having fluid spring chambers are arranged in a vehicle suspension apparatus. A roll control quantity determined in accordance with the relationship between a vehicle velocity and a steering angular velocity, i.e., inlet solenoid valves and exhaust solenoid valves, are controlled in accordance with a solenoid ON/OFF time, thereby controlling the roll of a vehicle.

8 Claims, 9 Drawing Sheets

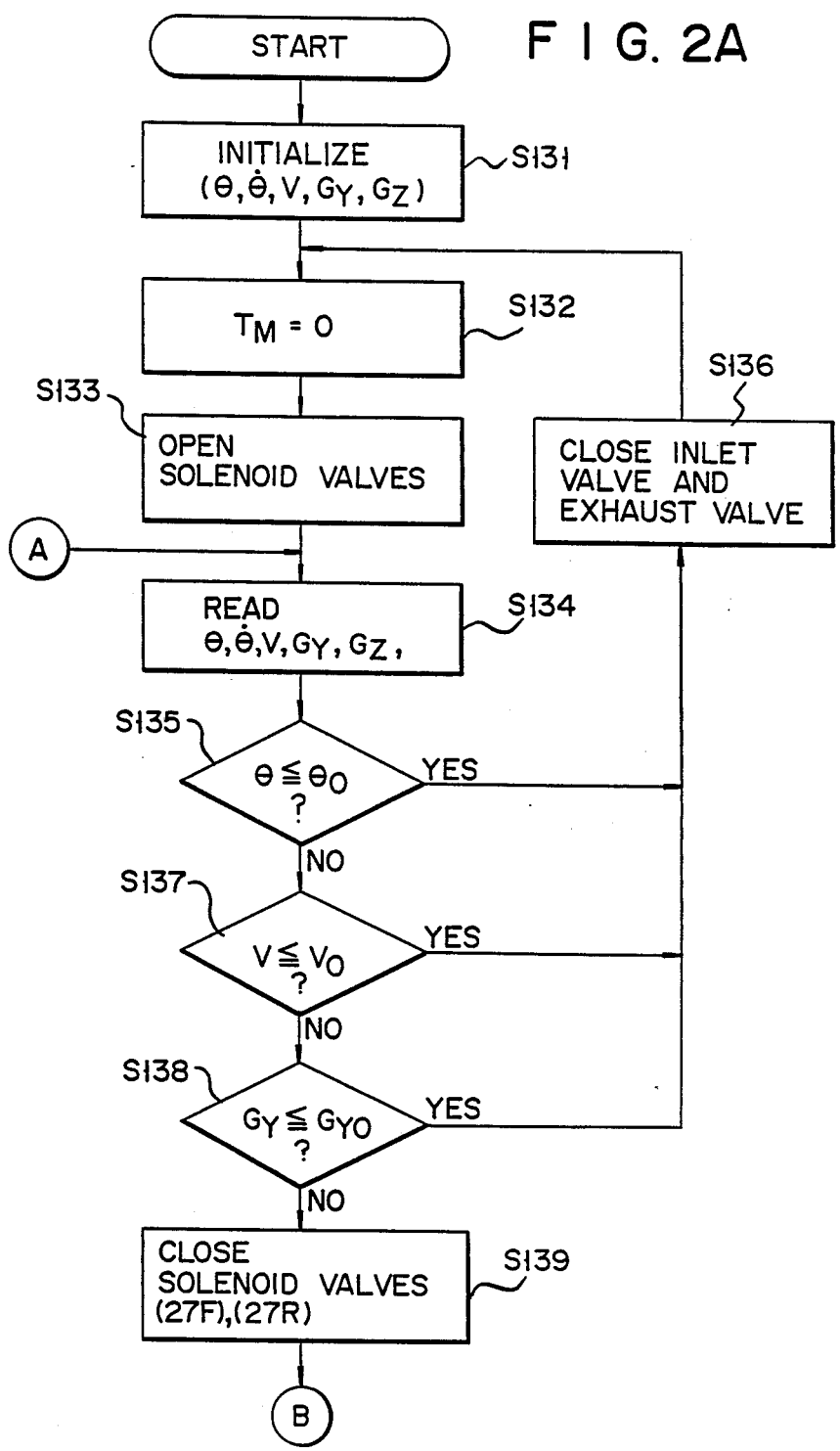

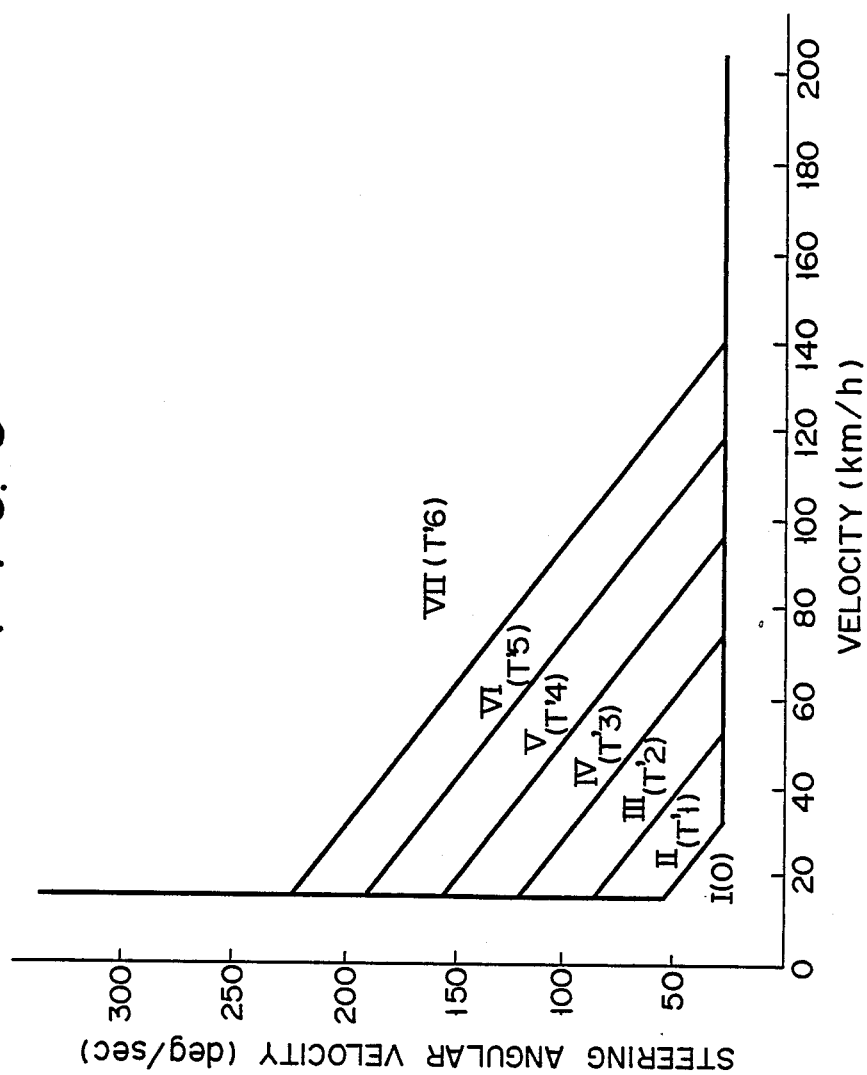

VEHICLE SUSPENSION APPARATUS

This application is a divisional of copending application Ser. No. 694,666, filed on Jan. 24, 1985 now U.S. Pat. No. 4,730,843.

BACKGROUND OF THE INVENTION

1. Field of the Invention

The present invention relates to a vehicle suspension apparatus for roll controlling of a vehicle when the vehicle turns.

2. Description of the related art

A conventional suspension apparatus is proposed wherein the damping force of a shock absorber mounted in a suspension unit for each wheel and the spring force of an air spring chamber therein are controlled to improve driving comfort and stability. However, demand has arisen to restrict more properly the roll of the vehicle body when the vehicle turns, and to improve driving comfort and stability.

SUMMARY OF THE INVENTION

It is an object of the present invention to provide a vehicle suspension apparatus to control the roll of a vehicle when the vehicle turns.

Another object of the invention is to provide a vehicle suspension apparatus which can provide stable roll control without being influenced by the number of occupants in the vehicle, thereby substantially eliminating the disadvantage that the occupants feel uncomfortable during roll control.

In order to achieve the above object of the present invention, there is provided a vehicle suspension apparatus having suspension units mounted on respective wheels, each unit having a fluid spring chamber, fluid supply means for supplying a fluid to each fluid spring chamber through a fluid supply valve, fluid exhaust means for exhausting the fluid from each fluid spring chamber through a fluid exhaust valve, first communicating means connecting a first communication control valve to the fluid spring chambers of the right and left front wheel suspension units, second communicating means connecting a second communication control valve to the fluid spring chambers of the right and left rear wheel suspension units, steering angle detecting means for detecting steering angular velocity, velocity detecting means for detecting a vehicle velocity, first pressure detecting means for detecting an internal pressure of the fluid spring chamber, and a controller for generating a communication control signal and a roll control signal when both the steering angular velocity, which is calculated from the steering angle detected by the steering angle detecting means, and the vehicle velocity, which is detected by the velocity detecting means are higher than their prescribed levels, the first and second communication control valves being closed by the communication control signal, and the fluid supply valves in the fluid spring chambers located on the contracted side with respect to a roll direction and the fluid exhaust valves in the fluid spring chambers located on the elongated side with respect to the roll direction being opened during a preset control time by the roll control signal, wherein the controller determines the length of control time in accordance with the steering angular velocity which is calculated from the steering angle detected by the steering angle detecting means and with the vehicle velocity detected by the vehicle velocity detecting means, corrects the control time on the basis of the detected internal pressure of the fluid spring chamber, and adopts the control time as the preset control time.

BRIEF DESCRIPTION OF THE DRAWINGS

FIGS. 2A and 2B are flow charts for explaining the operation of a first embodiment of the present invention;

FIG. 3 is a graph for explaining the steering angular velocity as a function of the velocity;

DETAILED DESCRIPTION OF THE PREFERRED EMBODIMENTS

Figure 1:
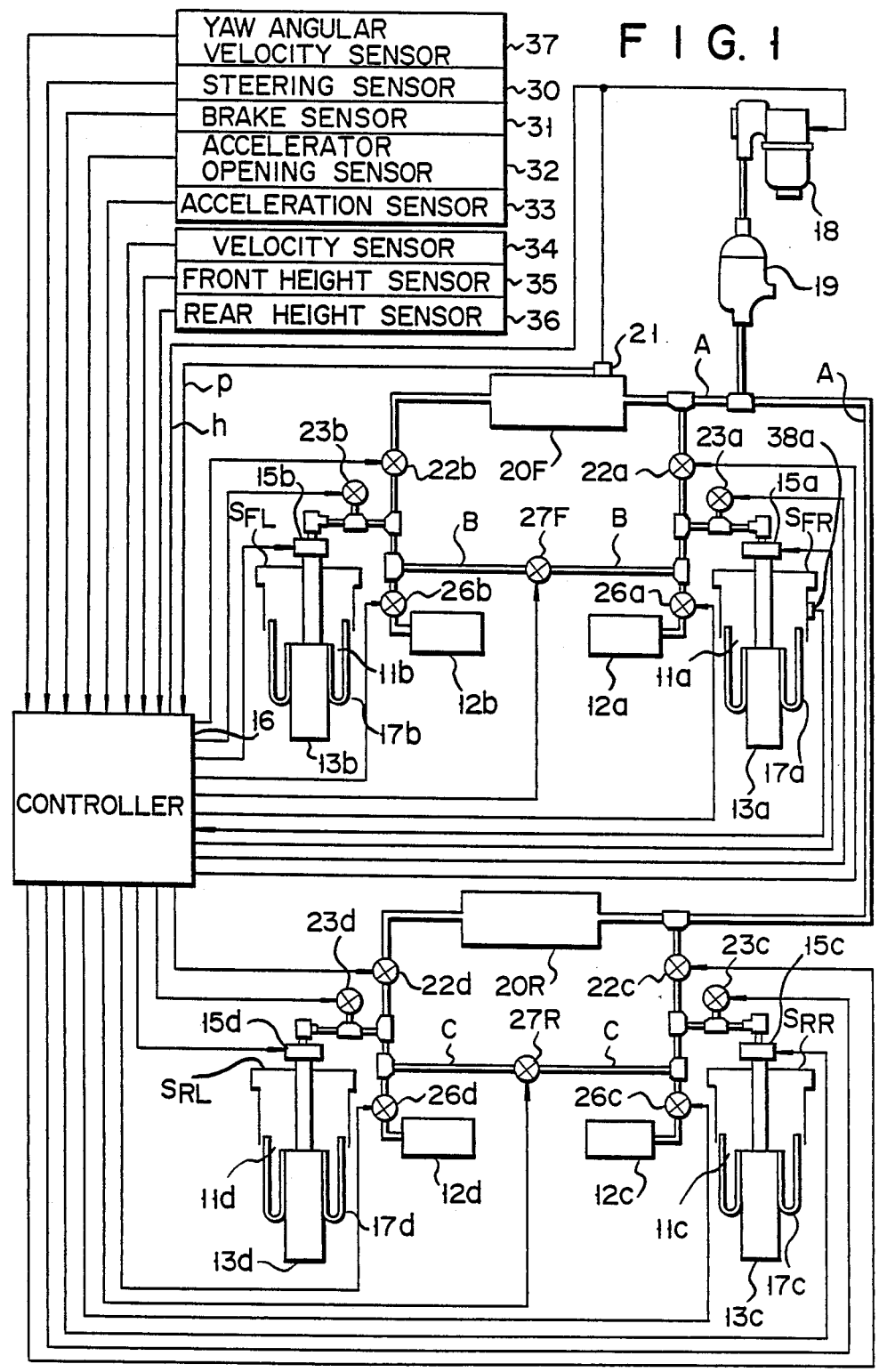
FIG. 1 is a diagram showing the overall construction of a vehicle suspension apparatus according to an embodiment of the present invention.

An electronically controlled suspension apparatus according to the present invention will be described with reference to the accompanying drawings. Referring to FIG. 1, reference symbol $S_{FR}$ denotes a right front wheel suspension unit; $S_{FL}$, a left front wheel suspension unit; $S_{RR}$, a right rear wheel suspension unit; and $S_{RL}$, a left rear wheel suspension unit. The suspension units $S_{FR}$, $S_{FL}$, $S_{RR}$ and $S_{RL}$ respectively comprise main air spring chambers 11a to 11d, sub-air spring chambers 12a to 12d, shock absorbers 13a to 13d, and coil springs (not shown) serving as auxiliary springs. Reference numerals 15a to 15d denote switches for increasing or decreasing the damping forces of the shock absorbers 13a to 13d, respectively. The switches 15a to 15d are controlled by a controller 16. Reference numerals 17a to 17d denote bellows, respectively.

Reference numeral 18 denotes a compressor for compressing atmospheric air supplied from an air cleaner (not shown) and supplying compressed air to a drier 19. The drier 19 dries compressed air by using silica gel or the like. The dried compressed air from the drier 19 is stored in a front wheel reserve tank 20F and a rear wheel reserve tank 20R through piping A. Reference numeral 21 denotes a pressure sensor arranged in the reserve tank 20F. When an internal pressure in the reserve tank 20F is decreased below a predetermined value, the pressure sensor 21 generates a signal. The compressor 18 is activated in response to this signal. When the internal pressure of the reserve tank 20F exceeds the predetermined value, the compressor 18 is stopped in response to the signal from the pressure sensor 21. An internal pressure signal p from the reserve tank 20F is supplied to the controller 16. The compressor 18 can be controlled in response to a signal h from the controller 16.

The reserve tank 20F is coupled to the main air spring chamber 11a through an inlet solenoid valve 22a. Similarly, the reserve tank 20R is coupled to the main air spring chamber 11b through an inlet solenoid valve 22b. Furthermore, the reserve tank 20R is connected to the main air spring chamber 11c through an inlet solenoid valve 22c. Similarly, the reserve tank 20R is coupled to the main air spring chamber 11d through an inlet solenoid valve 22d. It should be noted that the solenoid valves 22a to 22d comprise normally closed valves.

The compressed air is exhausted to the atmosphere from the main air spring chambers 11a to 11d through corresponding exhaust solenoid valves 23a to 23d and then through an exhaust pipe (not shown). It should be noted that the solenoid valves 23a to 23d comprise normally closed valves.

The main air spring chamber 11a is coupled to the sub-air spring chamber 12a through a spring constant adjusting solenoid valve 26a. Similarly, the main air spring chambers 11b, 11c and 11d are coupled to the sub-air spring chambers 12b, 12c and 12d through spring constant adjusting solenoid valves 26b, 25c and 26d.

The main air spring chambers 11a and 11b are coupled to each other through a communicating pipe B and a communicating solenoid valve 27F. Similarly, the air spring chambers 11c and 11d are coupled to each other through a communicating pipe C and a communicating solenoid valve 27R. It should be noted that the solenoid valves 27F and 27R comprise normally open valves.

The solenoid valves 22a to 22d, 23a to 23d, 26a to 26d, 27F and 27R are controlled in response to control signals from the controller 16.

Figure 7:
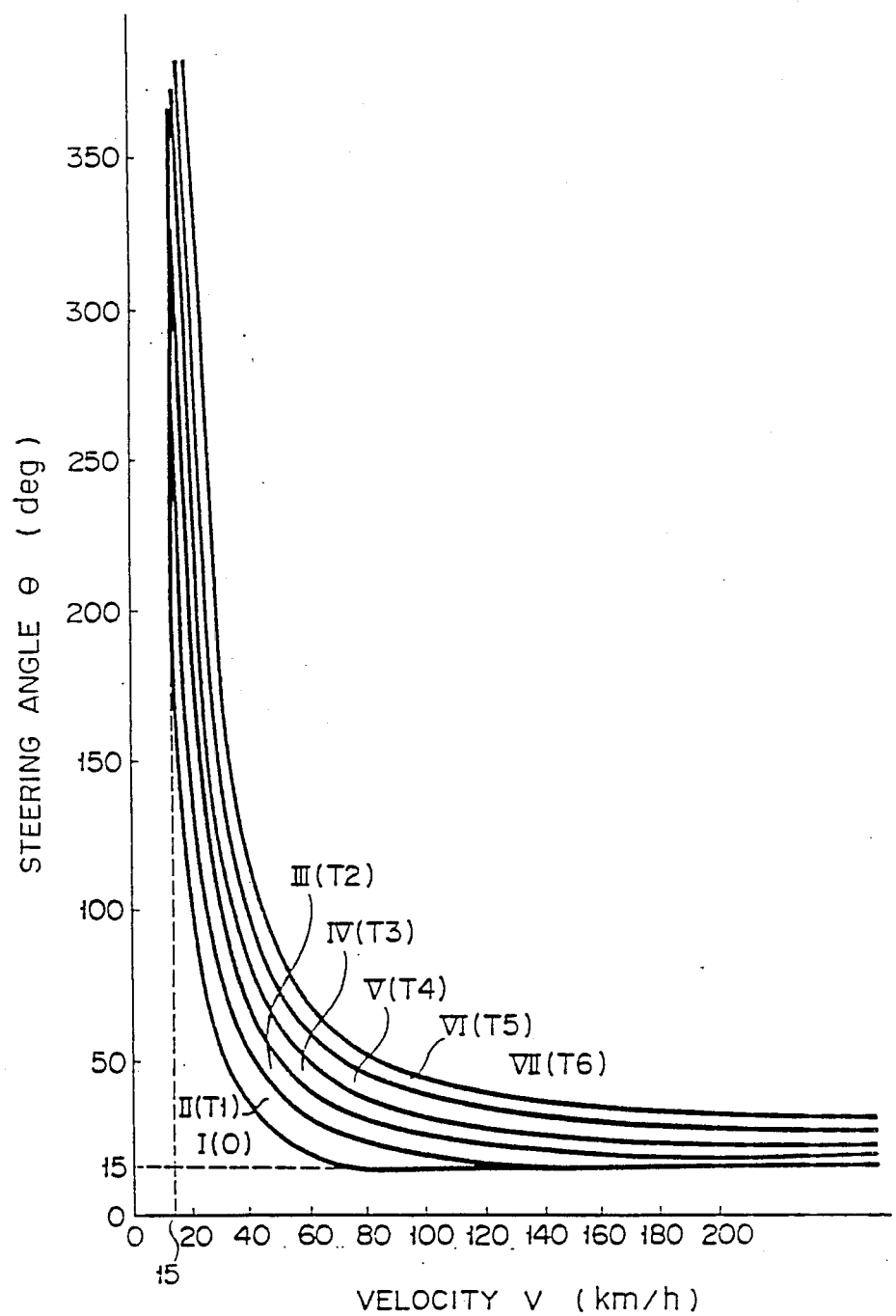

Reference numeral 30 denotes a steering sensor for detecting a steering wheel angle; 31, a brake sensor for detecting the ON/OFF state of the brake unit; 32, an accelerator opening sensor for detecting a throttle valve opening; 33, an acceleration sensor for detecting acceleration along the horizontal and vertical directions; 34, a velocity sensor for detecting a vehicle velocity; 35, a front height sensor for detecting a height at the front portion (front wheel portion) of the vehicle; 36, a rear height sensor for detecting a height at the rear portion (rear wheel portion) of the vehicle; 37, a yaw angular velocity sensor for detecting the yaw angular velocity of the vehicle; and 38a, an internal pressure sensor for detecting the internal pressure of the main air spring chamber 11a. Steering sensor 30 may be of the digital type or the analog type which is widely used. As the digital type sensor, the steering sensor disclosed in SAE paper 840341 "Toyota Electronic Modulated Suspension (TEMS) System for the 1983 Soarer" (page 7, FIG. 18), or the sensor disclosed in SAE paper 840258 "Chassis Electronic Control System for the Mitsubishi 1984 Galant" (page 4, FIG. 7) may be used. Alternatively, potentiometer 41 disclosed in U.S. Pat. No. 3,608,925 may be used as the analog type steering sensor. Further, the acceleration sensor disclosed in SAE paper 840258 or the like may be employed as the lateral acceleration sensor. Signals from the sensors 30 to 37 and 38a are supplied to the controller 16. Pressure sensors for detecting an internal pressure of the main air spring chambers 11b to 11d are not shown.

Figure 2B:
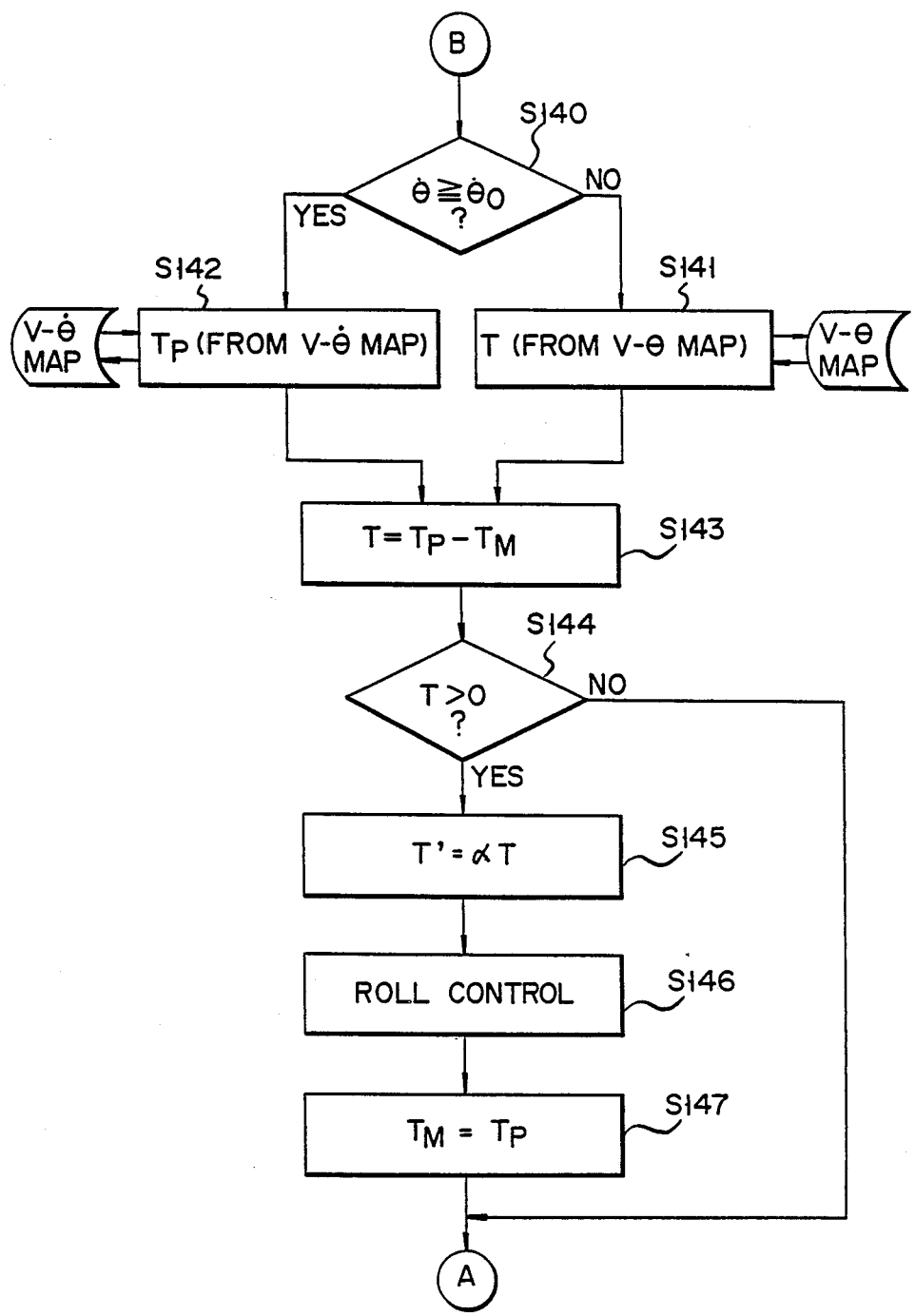

A first embodiment of the present invention will be described with reference to flow charts of FIGS. 2A and 2B. When the driver turns on the ignition, the controller 16 starts the operation in accordance with the flow charts of FIGS. 2A and 2B. In step S131, the predetermined memory area of the controller 16 which stores the steering angle $\theta$, the steering angular velocity $\dot{\theta}$, the velocity V, the vertical acceleration $G_Z$, and the horizontal acceleration $G_Y$ along the widthwise direction of the vehicle body is cleared. In step S132, the map memory $T_M$ is reset ($T_M=0$). In step S133, the controller 16 checks that the communicating solenoid valves 27F and 27R are open. In step S134, the steering angle detected by the steering sensor 30 is supplied to the controller 16. The controller 16 calculates the steering angular velocity $\dot{\theta}$, i.e., a change in steering angle as a function of time. Furthermore, the velocity V detected by the velocity sensor 34 and the accelerations $G_Y$ and $G_Z$ detected by the acceleration sensor 33 are fetched by the controller 16. The controller 16 then checks in step S135 whether or not the steering angle $\theta$ corresponds to the neutral position, i.e., condition $\theta \leq \theta 0$ is established where $\theta 0$ is the reference angle. Here the neutral position indicates that the steering wheel is not turned clockwise or counterclockwise over the reference angle. If YES in step S135, the flow advances to step S136. In step S136, the controller 16 checks that the inlet solenoid valves 22a to 22d and the exhaust solenoid valves 23a to 23d are closed. In this case, if the valves are not closed, they are closed under the control of the controller 16.

However, if NO in step S135, the flow advances to step S137. The controller 16 checks in step S137 whether or not the velocity V is equal to or lower than the reference velocity VO. If YES in step S137, the flow advances to step S136. However, if NO in step S137, the flow advances to step S138. The controller 16 checks in step S138 whether or not the horizontal acceleration $G_Y$ is equal to or smaller than a reference acceleration $G_{YO}$. If YES in step S138, the flow returns to step S136.

However, if NO in step S138, roll control after step S139 is started. More particularly, roll control after step S138 is performed when the steering angle is larger than the reference steering angle $\theta 0$, the velocity V is larger than the reference velocity VO, and the acceleration $G_Y$ is larger than the reference acceleration $G_{YO}$. In step S139, the solenoid valves 27F and 27R are closed under the control of the controller 16. The controller 16 then checks in step S140 whether or not the steering angular velocity is equal to or larger than the reference steering angular velocity $\dot{\theta}0$. If NO in step S140, the flow advances to step S141. In step S141, the controller 16 calculates a control time $T_P$ (i.e., a time for opening the solenoid valves) in accordance with a V-$\theta$ map (FIG. 7) by using the steering angle $\theta$ and the velocity V. The control time $T_P$ is determined in accordance with regions I to VII of the V-$\theta$ map of FIG. 7 and is represented in parentheses.

If YES in step S140, the flow advances to step S142. In step S142, a control time $T_P$ (i.e., a time for opening the solenoid valves) is calculated in accordance with V-$\dot{\theta}$ map (FIG. 3) by using the steering angular velocity and the velocity V. This control time $T_P$ is determined by regions I to VII of V-$\dot{\theta}$ map of FIG. 3 and is represented in parentheses. When step S141 or S142 is completed, the flow advances to step S143 wherein a control time $T(=T_P-T_M)$ is calculated. The controller 16 checks in step S144 whether or not condition $T>0$ is established. If NO is step S144, the flow returns to step S134. In this case, roll control is not performed. However, if YES in step S144, the flow advances to step S145. In step S145, the control time T obtained in step S143 is corrected. More particularly, a correction coefficient $\alpha$ is multiplied with the control time T to obtain the actual control time T'. This correction is performed for the following reason. When the internal pressures of the main air spring chambers 11a to 11d are kept high, it takes a long period of time to supply the compressed air from the reserve tank 20F (20R) to the main air spring chambers 11a to 11d. In addition, when the internal pressures of the reserve tanks 20F and 20R are kept high, the amount of compressed air supplied to the air spring chambers is increased when the inlet solenoid valves 22a to 22d are opened for the same predetermined period of time as in the case wherein the internal pressures of the reserve tanks 20F and 20R are kept low. In this manner, the correction coefficient is determined in accordance with the internal pressures of the main air spring chambers 11a to 11d and the reserve tank 20F (20R). In step S146, the inlet solenoid valves 22a to 22d and the exhaust solenoid valves 23a to 23d are opened for the control time T' under the control of the controller 16, thereby performing roll control. For example, when the steering wheel is turned clockwise, the left wheel inlet solenoid valves 22b and 22d are opened for the control time T' to supply the compressed air to the main air spring chambers 11b and 11d under the control of the controller 16. In this case, the left suspension units $S_{FL}$ and $S_{RL}$ are biased to increase the left vehicle height. At the same time, the right wheel exhaust solenoid valves 23a and 23c are opened for the control time T' to exhaust the compressed air from the right wheel main air spring chambers 11a and 11c under the control of the controller 16, thereby biasing the right suspension units $S_{FR}$ and $S_{RR}$ to decrease the right vehicle height. In this manner, when the steering wheel is turned clockwise, the left vehicle height will not be decreased, and the right vehicle height will not be increased, thereby maintaining the vehicle body horizontally.

When the operation in step S146 is completed, the flow advances to step S147, wherein the map memory is updated, i.e., let $T_M$ be $T_P$. The flow then returns to step S134. When any one of steps S135, S137 and S138 is determined to be YES, the flow advances to step S133 through step S136. The communicating solenoid valves 27F and 27R are opened to cancel roll control.

Roll control is cancelled when the steering wheel is returned to the neutral position, the velocity becomes lower than the reference velocity $V_O$, or the horizontal acceleration $G_y$ becomes lower than the reference acceleration $G_{YO}$. Even if the velocity of the acceleration $G_Y$ is larger than the corresponding reference value, roll control can be properly cancelled when the steering wheel returns to the neutral position.

Figure 4:
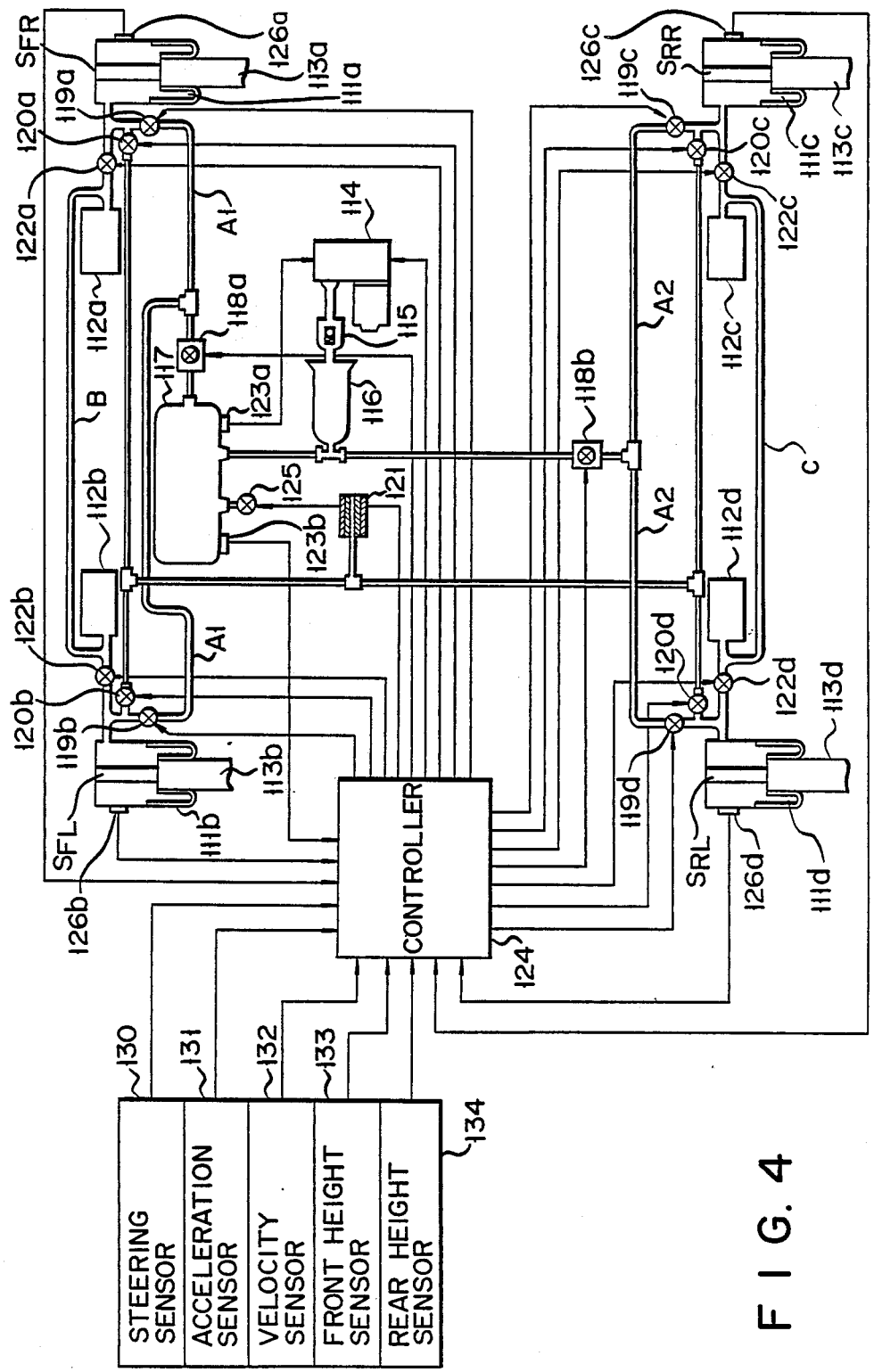
FIG. 4 is a diagram showing a vehicle suspension apparatus according to a second embodiment.

A second embodiment of the present invention will be described with reference to FIGS. 4 to 6. Referring to FIG. 4, reference symbol $S_{FR}$ denotes a right front wheel suspension unit; $S_{FL}$, a left front wheel suspension unit; $S_{RR}$, a right rear wheel suspension unit; and $S_{RL}$, a left rear wheel suspension unit. The suspension units $S_{FR}$, $S_{FL}$, $S_{RR}$ and $S_{RL}$ comprise main air spring chambers 111a to 111d, sub-air spring chambers 112a 112d, shock absorbers 113a to 113d, and coil springs (not shown) serving as auxiliary springs, respectively. Reference numeral 114 denotes a compressor. The compressor 114 compresses atmospheric air supplied from an air clearer (not shown) and supplies the compressed air to a reserve tank 117 through a check valve 115 and a drier 116. The drier 116 dries the compressed air using silica gel or the like.

The compressed air stored in the reserve tank 117 is supplied to the main air spring chamber 111a through an inlet path selecting solenoid valve 118a and an inlet solenoid valve 119a which are arranged along a piping A1. The compressed air is also supplied to the main air spring chamber 111b through the inlet path selecting solenoid valve 118a and an inlet solenoid valve 119b.

The compressed air is also supplied to the main air spring chamber 111c through an inlet path selecting solenoid valve 118b and an inlet solenoid valve 119c which are arranged along a piping A2. Finally, the compressed air is supplied to the main air spring chamber 111d through the inlet path selecting solenoid 118b and the inlet solenoid valve 119d. In this case, the inlet path selecting solenoid valves 118a and 118b have the same construction. The solenoid valves 118a and 118b can select a large or small compressed air path by detecting whether or not the corresponding solenoid is energized.

The compressed air frm the main air spring chambers 111a to 111d is exhausted to the atmosphere through air exhaust solenoid valves 120a to 120d and an exhaust pipe 121.

The main air spring chambers 111a and 111b are coupled to each other through a communicating solenoid valve 122a, a communicating pipe B and a communicating solenoid valve 122b. The communicating solenoid valve 122a controls communication between the main and sub-air spring chambers 111a and 112a. Similarly, the communicating solenoid valve 122b controls communication between the main and sub-air spring chambers 111b and 112b. The main air spring chambers 111c and 111d are coupled to each other through a communicating solenoid valve 122c, a communicating pipe C and a communicating solenoid valve 122d. The solenoid valve 122c controls communications between the main and sub-air spring chambers 111c and 112c. Similarly, the solenoid valve 122d controls communication between the man and sub-air spring chambers 111d and 112d.

It should be noted that the inlet solenoid valves 119a to 119d and the exhaust solenoid valves 120a to 120d comprise normally closed valves, and that the communicating solenoid valves 112a to 112d comprise normally open valves.

When the solenoid coils of the valves 118a and 118b are energized, the valves 118a and 118b close the large-diameter path and open only the small-diameter path to allow a small amount of compressed air per unit time to flow through the small-diameter path. However, when the solenoid coils are deenergized, both the large- and small-diameter paths are opened to allow a large amount of compressed air per unit time to flow therethrough.

Reference numerals 123a and 123b denote pressure sensors arranged in the reserve tank 117. When the internal pressure of the reserve tank 117 is decreased below the reference pressure, the compressor 114 is started in response to a signal from the pressure sensor 123a. When the internal pressure of the reserve tank 117 rises above the reference pressure, the compressor 114 is stopped in response to a signal from the pressure sensor 123a.

The pressure sensor 123b constantly detects the internal pressure of the reserve tank 117. An internal pressure detection signal is supplied to a controller 124. Reference numeral 125 denotes a reserve tank water drainage solenoid valve. Reference numerals 126a to 126d denote main tank pressure sensors arranged in the main air spring chambers 111a to 111d, respectively. The pressure sensors 126a to 126d constantly detect the internal pressures of the main air spring chambers 111a to 111d, respectively. Detection signals from the sensors 126a to 126d are supplied to the controller 124.

It should be noted that the solenoid valves 118a, 118b, 119a to 119d, 120a to 120d, 122a to 122d and 125 are controlled in response to control signal from the controller 124.

Reference numeral 130 denotes a steering sensor for detecting a steering angle; 131, an acceleration sensor for detecting a longitudinal acceleration, a lateral acceleration and a vertical acceleration; 132, a velocity sensor for detecting a velocity; 133, a front height sensor for detecting a front height (front body portion height) of the vehicle body; and 134, a rear height sensor for detecting a rear height (rear body portion height). Signals from the sensors 130 and 134 are supplied to the controller 124.

Figure 5A:
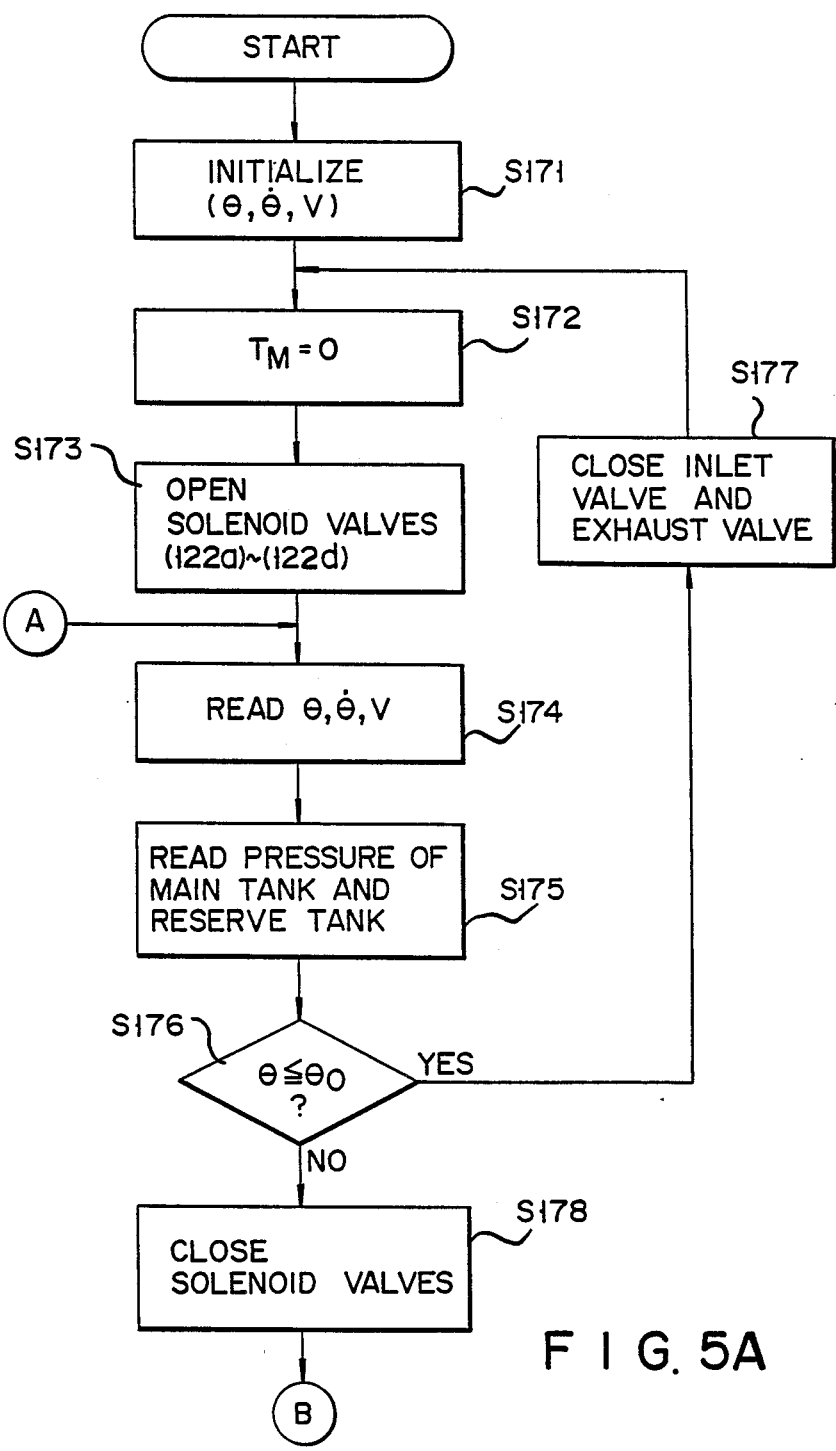
FIGS. 5A and 5B are flow charts for explaining the operation of a second embodiment of the present invention.
Figure 5B:
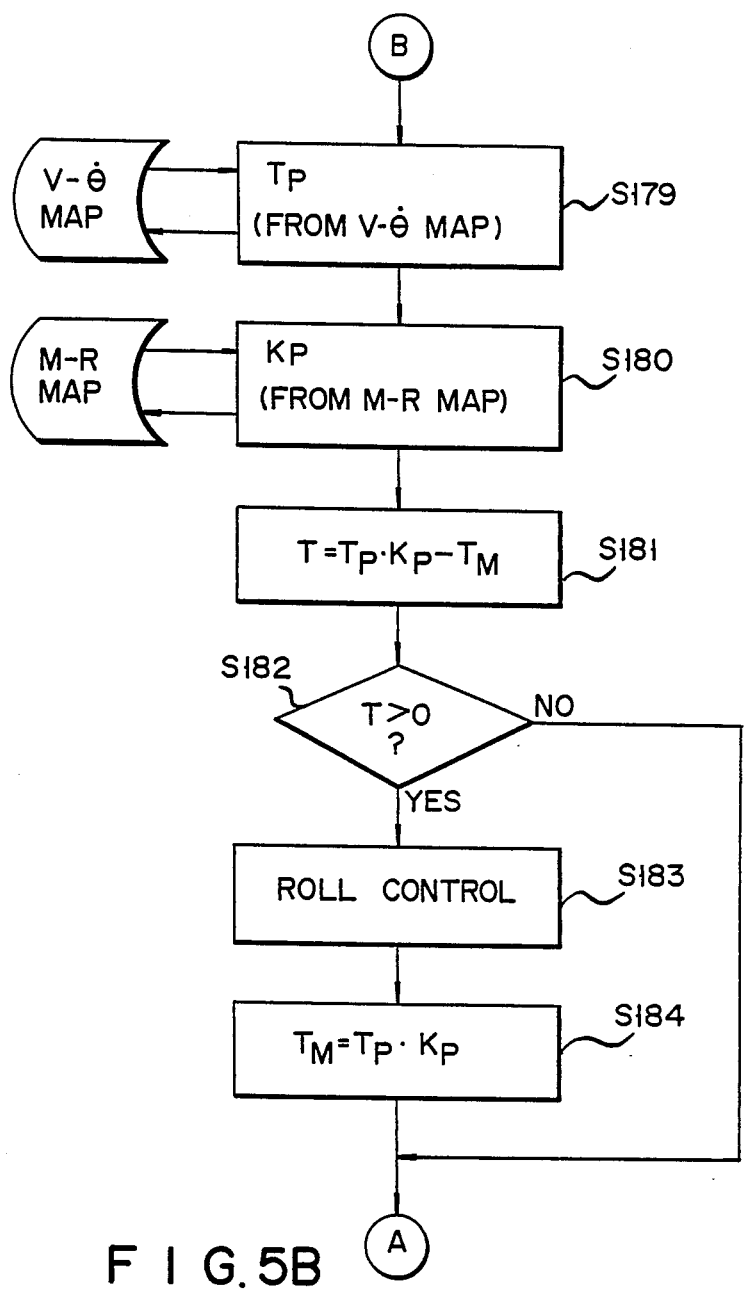

The operation of the apparatus having the construction described above will be described with reference to the flow charts of FIGS. 5A and 5B. When a driver turns on the ignition, the controller 124 performs the operation in accordance with the flow charts of FIGS. 5A and 5B. In step S171, a predetermined memory area of the controller 124, which stores the steering angle $\theta$, the steering angular velocity $\dot{\theta}$ and the velocity V, is cleared. In step S172, the map memory $T_M$ is reset ($T_M=0$). In step S173, the controller 124 checks that the communicating solenoid valves 122a to 122d are open. However, if these solenoid valves are closed, they are opened under the control of the controller 124. The steering angle $\theta$ detected by the steering sensor 130 is fetched by the controller 124 in step S174. The controller 124 calculates the steering angular velocity $\dot{\theta}$, i.e., a change in the steering angle as a function of time. Furthermore, the velocity V detected by the velocity sensor 132 is fetched by the controller 124. In step S175, the internal pressure data detected by the pressure sensors 126a to 126d for the main air spring chambers 111a to 111d and by the pressure sensor 123b for the reserve tank 117 are also fetched by the controller 124. The controller 124 then checks in step S176 whether or not the steering angle corresponds to the neutral steering wheel position, i.e., the condition $\theta<\theta0$ is established. Here the neutral position indicates that the steering wheel is not turned clockwise or counterclockwise over the reference angle $\theta0$. If YES in step S176, the flow advances to step S177. In step S177, the controller 124 checks that the inlet solenoid valves 119a to 119d and the exhaust solenoid valves 120a to 120d are closed. However, if these valves are not closed, they are closed under the control of the controller 124.

However, if NO in step S176, the roll control is started after step S178. More particularly, in step S178, the communicating solenoid valves 122a to 122d are closed under the control of the controller 124. In step S179, a control time $T_P$ (i.e., a time for opening the solenoid valves) is calculated in accordance with the V-$\dot{\theta}$ map of FIG. 3 by using the steering angular velocity $\dot{\theta}$ and the velocity V. This control time $T_P$ is determined by the regions I to VII of the V-$\theta$ map of FIG. 3, and is represented in parentheses.

Figure 6:
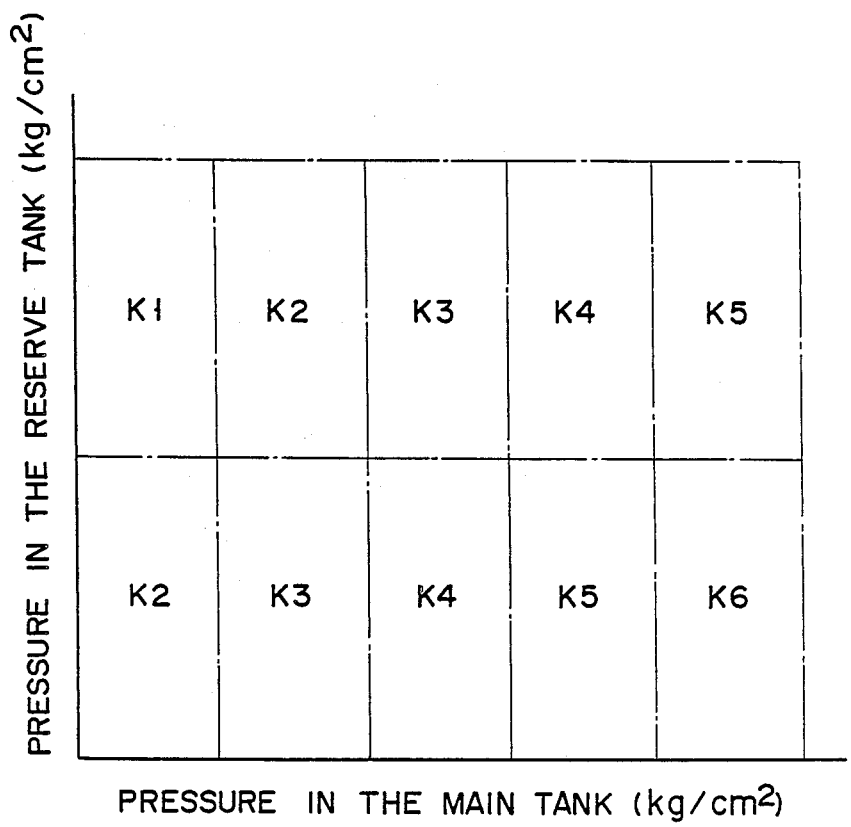
FIG. 6 is a graph explaining the pressure in the reserve tank as a function of the pressure in the main tank; and, FIG. 7 is a graph for explaining the steering angle as a function of the velocity.

In step S180, a correction coefficient $K_P$ is calculated in accordance with a main tank internal pressure-reserve tank internal pressure map (an M-R map) of FIG. 6 by using the internal pressures of the main air spring chambers 111a to 111d and the reserve tank 117. A correction value for the control time $T_P$ is calculated in accordance with the internal pressures of the main air spring chambers 111a to 111d and the reserve tank 117. The correction coefficient $K_P$ is determined in accordance with K1 to K6 in FIG. 23.

When steps S179 and S180 have been completed, the flow advances to step S181 wherein a control time $T(=T_P\times K_P-T_M)$ will be calculated. The controller 124 then checks in step S182 whether or not condition $T>0$ has been established. If NO in step S182, the flow returns to step S174. In this case, roll control is not performed. However, if YES in step S182, the flow advances to step S183. In step S183, the inlet solenoid valves 119a to 119d and the exhaust solenoid valves 120a to 120d are opened for the corrected control time T to perform roll control. For example, when the steering wheel is turned clockwise, the left wheel inlet solenoid valves 119b and 119d are opened for the control time T to supply the compressed air to the main air spring chambers 111b and 111d under the control of the controller 124. In this case, the left suspension units $S_{FL}$ and $S_{RL}$ are biased to increase the left height. At the same time, the right wheel exhaust solenoid valves 120a and 120c are opened for the control time T to exhaust the compressed air from the right wheel main air spring chambers 111a and 111c under the control of the controller 124, thereby biasing the right suspension units $S_{FR}$ and $S_{RR}$ to decrease the right vehicle height. Therefore, when the steering wheel is turned clockwise, the left height will not be decreased and the right height will not be increased, thereby maintaining the vehicle body horizontally.

In this case, the control time $T_P$ calculated in step S179 is corrected in accordance with the correction coefficient $K_P$ corresponding to the internal pressures of the main air spring chambers 111a to 111d and the reserve tank 117. The compressed air is supplied from the reserve tank 117 to the main air spring chambers 111a to 111d for the corrected control time T, thereby providing optimal roll control. For example, when the internal pressures of the main air spring chambers 111a to 111d are relatively high and the compressed air cannot be easily supplied thereto, or when the internal pressure of the reserve tank 117 is relatively low and the compressed air cannot be easily supplied therefrom, the interval pressures of the main air spring chambers 111a to 111d can be properly corrected as target internal pressures.

When the operation in step S183 has been completed, the flow advances to step S184 wherein the map memory is updated, i.e., let $T_M$ be $T_P\times K_P$.

In this way, roll control of a vehicle can be performed according to the solenoid valve ON time given by the V-$\dot{\theta}$ map. Therefore, the control time can be corrected in accordance with the correction coefficient obtained by the M-R map. The internal pressures of the main air spring chambers can be adjusted as the target pressures without being influenced by the internal pressures of the main air spring chambers and the reserve tank, which are obtained prior to roll control. Therefore, optimal roll control can be performed, and hence rolling of the vehicle is prevented, which greatly improves steering stability.

In the first and second embodiments, air is used as a working fluid. However, the working fluid may comprise another safe and controllable fluid.

In the above embodiments, the present invention is applied to a suspension apparatus using an air spring utilizing air (gas). However, the present invention may also be applied to a hydropneumatic type suspension apparatus using a gas and a liquid.

What is claimed is:

1. A vehicle suspension apparatus comprising:

a suspension unit mounted on respective right and left front wheels and right and left rear wheels, each unit having a fluid spring chamber;

fluid supply means for supplying a fluid to each fluid spring chamber through a fluid supply valve;

fluid exhaust means for exhausting the fluid from each fluid spring chamber through a fluid exhaust valve;

first communicating means connecting a first communication control valve to said fluid spring chambers of said right and left front wheel suspension units;

second communicating means connecting a second communication control valve to said fluid spring chambers of said right and left rear wheel suspension units;

steering angle detecting means for detecting steering angle;

velocity detecting means for detecting a vehicle velocity;

first pressure detecting means for detecting an internal pressure of said fluid spring chambers; and a controller for generating a communication control signal and a roll control signal when both the steering angular velocity, which is calculated from the steering angle detection by said steering angle detecting means, and the vehicle velocity, which is detected by said velocity detecting means are higher than their prescribed levels, said first and second communication control valves being closed be said communication control signal, and said fluid supply valves on the fluid spring chambers located on the contracted side with respect to a roll direction and said fluid exhaust valves in the fluid spring chambers located on the elongated side with respect to the roll direction being opened during a preset control time by said roll control signal, wherein said controller determines the length of control time in accordance with the steering angular velocity which is calculated from the steering angle detected by said steering angle detecting means and with the vehicle velocity detected by said vehicle velocity detecting means, corrects the control time on the basis of the detected internal pressure of said fluid spring chamber, and adopts said control time as said preset control time.

2. An apparatus according to claim 1, further comprising second pressure detecting means for detecting an internal pressure of a fluid source of said fluid supply means, and wherein said controller corrects said preset control time on the basis of the internal pressure of the fluid spring chamber, detected by said first pressure detecting means, and the internal pressure of the fluid source, detected by said second pressure detecting means.

3. An apparatus according to claim 1, wherein said controller is designed such that said communication control signal, by which said first and second communication control means are opened, is generated when the absolute value of the steering angle detected by said steering angle detecting means is smaller than a preset value.

4. An apparatus according to claim 1, wherein said controller is designed such that the communication control signal, by which said first and second communication control means are opened, is generated when the vehicle velocity detected by said vehicle velocity detecting means is equal to or smaller than a preset value.

5. An apparatus according to claim 1, further comprising lateral acceleration detecting means for detecting lateral acceleration acting on the vehicle body, and wherein said controller is designed such that the communication control signal, by which said first and second communication control valves are opened, is generated when the lateral acceleration detected by said lateral acceleration detecting means is equal to or smaller than a preset value.

6. An apparatus according to claim 1, wherein said controller comprises a first memory for storing a plurality of control times corresponding to the vehicle velocity and the steering angular velocity, the length of a first control time being obtained from said first memory in accordance with the detected vehicle velocity and steering angular velocity.

7. An apparatus according to claim 6, wherein said controller comprises a second memory which stores the first control time obtained from said first memory and which has contents thereof cleared when said communication control valves are open, said controller generating a supplementary roll control signal, when a first control time newly obtained from said first memory after the outputting of said roll control signal is longer than the first control time already stored in said second memory, for opening said fluid supply and exhaust valves for an additional period of time equal to the difference between the already stored first control time and the newly obtained first control time, and replacing the contents of said second memory with the newly obtained first control time.

8. A vehicle suspension apparatus comprising:

suspension units mounted on respective right and left front wheels and right and left rear wheels, each unit having a fluid spring chamber;

fluid supply means for supplying a fluid to each fluid spring chamber through a fluid supply valve;

fluid exhaust means for exhausting the fluid from each fluid spring chamber through a fluid exhaust valve;

first communicating means connecting a first communication control valve to said fluid spring chambers of said right and left front wheel suspension units;

second communicating means connecting a second communication control valve to said fluid spring chambers of said right and left rear wheel suspension units;

steering angle detecting means for detecting steering angle;

velocity detecting means for detecting a vehicle velocity;

pressure detecting means for detecting the internal pressure of a fluid source of said fluid supply means; and a controller for generating a communication control signal and a roll control signal when both the steering angular velocity, which is calculated from the steering angle detection by said steering angle detecting means, and the vehicle velocity, which is detected by said velocity detecting means are higher than their prescribed levels, said first and second communication control valves being closed by said communication control signal, and said fluid supply valves in the fluid spring chambers located on the contracted side with respect to a roll direction and said fluid exhaust valves in the fluid spring chambers located on the elongated side with respect to the roll direction being opened during a preset control time by said roll control signal, wherein said controller determines the length of control time in accordance with the steering angular velocity which is calculated from the steering angle detected by said steering angle detecting means and with the vehicle velocity detected by said vehicle velocity detecting means, corrects the control time on th basis of the internal pressure of said fluid source, detected by said pressure detecting means, and adopts said control time as said preset control time.

* * * * *